(12) United States Patent
Broussard, Sr. et al.

(10) Patent No.: US 6,337,023 B1
(45) Date of Patent: Jan. 8, 2002

(54) FLOTATION APPARATUS FOR CLARIFYING PRODUCED WATER

(76) Inventors: Paul C. Broussard, Sr.; Paul C. Broussard, Jr., both of P.O. Box 81098, Lafayette, LA (US) 70598-1098

(*) Notice: Subject to any disclaimer, the term of this patent is extended or adjusted under 35 U.S.C. 154(b) by 0 days.

(21) Appl. No.: 09/653,627

(22) Filed: Sep. 1, 2000

(51) Int. Cl.$^7$ .................................................. C02F 1/24
(52) U.S. Cl. ...................... 210/703; 210/741; 210/744; 210/205; 210/221.2; 210/194; 210/105; 210/104; 210/112; 210/115; 210/134; 210/137
(58) Field of Search .............................. 210/703, 221.2, 210/120, 134, 137, 112, 115, 104, 105, 194, 205, 741, 744

(56) References Cited

U.S. PATENT DOCUMENTS

| | | | |
|---|---|---|---|
| 2,047,989 A | * | 7/1936 | Woelflin |
| 2,730,190 A | * | 1/1956 | Brown |
| 2,730,240 A | * | 1/1956 | Brown |
| 2,766,203 A | * | 10/1956 | Brown |
| 3,452,869 A | | 7/1969 | O'Neill |
| 3,525,437 A | | 8/1970 | Kaeding |
| 3,576,738 A | | 4/1971 | Duffy |
| 3,616,919 A | | 11/1971 | Feddern |
| 3,725,264 A | | 4/1973 | Wheeler |
| 3,769,207 A | | 10/1973 | Baer |
| 3,784,468 A | | 1/1974 | Garcia |
| 3,849,311 A | | 11/1974 | Jakubek |
| 3,853,753 A | | 12/1974 | Jones |
| 3,884,803 A | | 5/1975 | Traylor |
| 3,932,282 A | | 1/1976 | Ettelt |
| 4,022,695 A | | 5/1977 | Howard |
| 4,086,160 A | | 4/1978 | Roesler |
| 4,094,783 A | * | 6/1978 | Jackson |
| 4,110,210 A | | 8/1978 | Degner |
| 4,173,533 A | * | 11/1979 | Williams |
| 4,198,300 A | * | 4/1980 | Williams |
| 4,226,706 A | | 10/1980 | Degner |
| 4,251,361 A | | 2/1981 | Grimsley |
| 4,255,262 A | | 3/1981 | O'Cheske |
| 4,372,757 A | * | 2/1983 | Favret, Jr. |
| 4,399,028 A | | 8/1983 | Kile |
| 4,564,457 A | * | 1/1986 | Cairo, Jr. et al. |
| 4,627,922 A | | 12/1986 | Viator |
| 4,752,399 A | | 6/1988 | Viator |
| 4,800,025 A | | 1/1989 | Bibaeff |
| 4,824,579 A | * | 4/1989 | George |
| 4,889,638 A | | 12/1989 | Rockford |
| 4,902,429 A | | 2/1990 | Carpenter |
| 4,986,903 A | | 1/1991 | Canzoneri |

(List continued on next page.)

*Primary Examiner*—Thomas M. Lithgow
(74) *Attorney, Agent, or Firm*—Greg R. Mier; Joseph L. Lemaine; Jesse D. Lambert (57) ABSTRACT

A dissolved gas flotation apparatus and process for removing oils and other contaminants from produced water generated in the production of crude petroleum and natural gas. The invention is particularly designed for offshore applications, where space is limited and natural gas is readily available. The invention includes a vessel for receiving and maintaining a liquid level therein and a circulating pump for introducing tiny flotation gas bubbles into the vessel. Natural gas is used as a blanket gas for the vessel and as a source of gas fed into the pump, wherein the gas is mixed with the pumped liquid. The liquid/gas mixture is transferred into the vessel, wherein the gas releases from the liquid, thereby forming tiny, finely dispersed gas bubbles. The tiny gas bubbles rise vertically through the vessel and attach themselves to the oil and other contaminants suspended in the liquid and buoyantly transport the oil and other contaminants to the top of the vessel, where the gas is released and either recycled back to the recirculating pump or transferred out of the vessel for further processing, and the oil and other contaminants are collected in a reservoir for recovery. The clarified water is removed from the vessel through a liquid outlet line located near the bottom of the vessel.

8 Claims, 5 Drawing Sheets

U.S. PATENT DOCUMENTS

| | | |
|---|---|---|
| 5,080,780 A * | 1/1992 | Canzoneri et al. |
| 5,080,802 A | 1/1992 | Cairo, Jr. |
| 5,462,669 A | 10/1995 | Yeh |
| 5,543,043 A | 8/1996 | Bates |
| 5,580,463 A | 12/1996 | Hubred |
| 5,584,995 A | 12/1996 | Meekel |
| 5,591,001 A * | 1/1997 | Ray et al. |
| 5,693,222 A | 12/1997 | Galvan |
| 5,707,530 A * | 1/1998 | Broussard, Jr. |

\* cited by examiner

FLOTATION APPARATUS FOR CLARIFYING PRODUCED WATER

BACKGROUND

1. Field of the Invention

The present invention relates generally to an apparatus and a process for the removal of insoluble substances from a liquid. More particularly, the present invention relates to a flotation apparatus and process for removing oils, solids, and other insoluble and/or suspended substances from produced water which is typically generated during the production of crude petroleum and natural gas.

2. Description of Related Art

Water contaminated with small amounts of oil, suspended solids, and/or other insoluble substances is a byproduct of many industrial operations such as, for example, the production and refining of crude petroleum and natural gas; the manufacturing of chemicals, paint, textiles, paper and pulp; the generation of electricity; and the processing of metals, food and beverages. A major problem faced in these industrial operations is the economic separation of the oil, suspended solids, and/or other insoluble substances from the water so that the water can be reused or discharged into the environment.

This separation problem is especially prevalent in the offshore production of crude petroleum and natural gas, where many oil and gas wells produce a certain amount of water or brine ("produced water") in conjunction with the oil and gas. The produced water is typically ladened with oil and other dissolved contaminants, and before it can be reinjected downhole or disposed back into the sea, the oil and other dissolved contaminants must be removed. Accordingly, numerous methods and systems have been devised to reduce the content of oil and other dissolved contaminants from produced water derived from offshore oil and gas wells.

One such method and system specially adapted for offshore operations is the skim pile, which is essentially a settling vessel consisting of a long vertical pipe that is installed adjacent to the offshore production platform. The skim pile normally extends from the lower deck of the platform to near the sea floor. Produced water containing oil and other dissolved contaminants is continuously introduced near the lower end of the skim pile and is permitted to separate into two layers, one layer being a relatively thin film of oil and other contaminants which forms at the top of the skim pile, and the other layer being a clarified zone of produced water which forms at the bottom of the skim pile. The oil and other contaminants are withdrawn from the top of the skim pile while the clean water is allowed to flow out the open bottom.

Two major limitations of skim piles are that they can only handle relatively low flow rates and they are generally ineffective at removing finely suspended solids or insoluble liquid droplets. Furthermore, it is difficult, if not impossible, to monitor the amount of oil and other contaminants flowing out the open bottom into the sea. For these and other reasons, skim piles are no longer the preferred method for separating oil from produced water. In fact, skim piles have been banned in the United States because of environmental concerns.

Other types of separation methods and systems, such as coalescers, have been developed and implemented to replace skim piles. Coalescers utilize a filter element to absorb and coalesce oil particles and other suspended contaminants from the liquid. (See U.S. Pat. No. 3,794,583.) A drawback is that the filter elements typically have a complex internal design and tend to get saturated with oil and plugged with suspended contaminants, necessitating frequent replacement or cleansing of the filter. Dismantling the unit for clean-up is time consuming and requires the availability of a back-up unit to maintain continuous production from the oil and gas fields. Moreover, the high cost of purchasing and maintaining filtration equipment militates against the use of these techniques in most industrial operations.

Because of the inherent problems associated with coalescers, other types of separation methods, such as gas flotation units, have been employed in the production of crude petroleum and natural gas. Gas flotation units are one of the most versatile methods for the clarification of produced water. These units utilize gas bubbles dispersed throughout the stream of produced water to agglomerate the oils and other contaminants and float them to the surface of the produced water where the gas is released and the oils and other contaminants are collected and separated from the produced water.

Gas flotation devices are well known in the art. A representative but not exhaustive list of the prior art includes U.S. Pat. Nos. 3,452,869; 3,525,437; 3,576,738; 3,616,919; 3,725,264; 3,769,207; 3,784,468; 3,849,311; 3,853,753; 3,884,803; 3,932,282; 4,022,695; 4,086,160; 4,110,210; 4,198,300; 4,255,262; 4,226,706; 4,251,361 ;4,399,028; 4,564,457; 4,627,922; 4,752,399; 4,800,025; 4,889,638; 4,902,429; 4,986,903; 5,080,802; 5,462,669; 5,543,043; 5,580,463, 5,584,995, and 5,693,222.

One specific type of gas flotation process is known as the dispersed-gas method. In a dispersed-gas flotation system, gas in the form of tiny bubbles is mechanically dispersed into the produced water either by means of an inductor device or by a vortex set up by mechanical rotors. The oil is floated to the surface by means of the tiny gas bubbles and thereafter is mechanically separated from the water, thereby producing an effluent water having a substantially reduced oil content. One such dispersed-gas unit is disclosed in U.S. Pat. No. 4,564,457. Another such dispersed-gas unit is disclosed in U.S. Pat. No. 4,255,262.

Another specific type of gas flotation process is known as the dissolved-gas method. In a dissolved-gas flotation system, gas at high pressure is dissolved into a slipstream of the produced water and introduced into a flotation tank at a lower pressure. Microbubbles of gas are released from the slipstream and allowed to rise gently through the produced water inside the flotation tank thereby lifting the oil and other contaminants to the surface.

The micro-bubbles of gas provide an expanded surface area which dramatically increases the probability of gas bubbles coming into contact with the oil and other contaminants contained in the produced water. For instance, a 9 millimeter (9,000 micron) gas bubble would present a surface area substantially smaller than 3 millimeters (3,000 microns). If the bubble size is further reduced to 0.01 to 0.04 millimeters (10 to 40 microns), the surface area yield would be many times greater for the identical gas inlet volume.

A dissolved-gas flotation system is disclosed in U.S. Pat. Nos. 3,576,738 and 3,725,264. Other dissolved-gas flotation systems are disclosed in U.S. Pat. Nos. 3,452,869 and 4,022,695.

There are several disadvantages inherent in both the dispersed-gas and dissolved-gas flotation systems. The first disadvantage is that both systems typically require a relatively large amount of space, creating problems in space critical applications, such as, for example, offshore operations. Dispersed-gas systems, in particular, usually require large moving parts that are high maintenance and energy intensive. For example, dispersed-gas systems usually employ motorized impellers, which are plagued with a number of fabrication, operational and maintenance disadvantages. Likewise, dissolved-gas systems require carefully controlled conditions in order to be effective and further require complex auxiliary equipment, such as pressurization chambers and compression pumps.

Thus, there is a pressing need for a compact flotation system which uses system gas to efficiently and effectively separate oil and/or suspended solids from produced water at high rates to enable reuse of the produced water or to allow discharge of the produced water into the environment. The present invention provides such an apparatus and method.

OBJECTS OF THE INVENTION

It is therefore an object of the present invention to provide a gas flotation apparatus and process for the separation of oils, solids, and other insoluble and/or suspended substances from produced water wherein the gas relied upon to facilitate the separation of the oils, solids, and other insoluble and/or suspended substances from the produced water can be the natural gas readily available on most offshore oil and gas production platforms.

It is another object of the present invention to provide a gas flotation apparatus and process for the separation of oils, solids, and other insoluble and/or suspended substances from produced water while occupying a minimum of space in space critical applications.

It is a further object of the present invention to provide a gas flotation apparatus and process for the separation of oils, solids, and other insoluble and/or suspended substances from produced water to generate a purer treated liquid product which can be reinjected down hole or discharged directly into the environment, if required, and an oil product which has significantly less water than the oily product produced by other flotation methods.

It is another object of the present invention to provide a gas flotation apparatus and process for the separation of oils, solids, and other insoluble and/or suspended substances from produced water which apparatus and process do not rely on high shear pumps, mixers, or gas saturated liquids to produce gas bubbles, and which apparatus and process reduce the number of components required for the overall flotation operation.

It is still another object of the present invention to provide a gas flotation apparatus and process which employs a centrifugal pump of the type disclosed in U.S. Pat. No. 5,591,001 to disperse gas bubbles into the produced water.

It is yet another object of the present invention to provide a gas flotation apparatus and process for the separation of oils, solids, and other insoluble and/or suspended substances from produced water wherein contact times are adequate for the gas to rise to the surface and disengage from the produced water.

It is a further object of the present invention to provide a gas flotation apparatus and process which obtains more complete and faster separation of oils, solids, and other insoluble and/or suspended substances from produced water without turbulence and back-mixing.

Another object of the present invention is to provide a gas flotation apparatus and process which can separate dilute concentrations of oils, solids, and other insoluble and/or suspended substances from produced water.

A further object of the present invention is to provide a gas flotation apparatus and process which can separate oils, solids, and other insoluble and/or suspended substances from produced water with the addition of little or no chemicals.

It is a further object of the present invention to provide a gas flotation apparatus and process which have improved means for intimate mixing of the produced water and gas.

Other and further objects, features and advantages of the present invention will be readily apparent to those skilled in the art when the following description of the preferred embodiments is read in conjunction with the accompanying drawings.

SUMMARY OF THE INVENTION

The present invention solves the problems unresolved by the prior art by using system gas to provide a compact apparatus for effectively and efficiently separating oils, solids, and other insoluble and/or suspended substances from produced water so as to enable reuse of the clarified produced water or to allow discharge of the clarified produced water into the environment.

Briefly, the present invention includes a vessel for receiving and maintaining a liquid level therein. Several process lines allow for the flow of materials in and out of the vessel, including a produced water inlet line, which supplies the vessel with produced water having oils, solids, and other insoluble and/or suspended substances (generally referred to as "oils and other contaminants"), and a gas supply line, which supplies a source of gas into the vapor space of the vessel.

A circulating pump provides a means for introducing tiny flotation gas bubbles into the vessel, and is preferably the type described in U.S. Pat. No. 5,591,001, issued on Jan. 7, 1997, to Robert B. Ray, et al. During operation of the pump, liquid is drawn into the pump and mixed with gas received from the vapor space of the vessel. The liquid and gas are mixed in the chamber of the pump and then discharged from the pump, whereupon the gas dissolves into the liquid after being subjected to the discharge pressure of the pump.

The liquid containing the dissolved gas is pumped into the vessel, where the liquid is uniformly distributed over a horizontal plane area preferably below the liquid level contained within the vessel. As the liquid is dispersed into the vessel, the dissolved gas effervescently releases from the liquid, thereby forming tiny, finely dispersed gas bubbles.

The tiny gas bubbles rise vertically through the produced water inside the vessel and attach themselves to the oils and other contaminants suspended in the liquid. Once attached, the gas bubbles reduce the density of the oils and other contaminants causing them to be buoyantly transported to the top of the liquid level in the vessel, where the gas bubbles "pop," thereby releasing the oils and other contaminants. The gas returns to the vapor space of the vessel where it is either recycled back to the recirculating pump or transferred out of the vessel for further processing. The released oils and other contaminants form a film on top of the liquid level inside the vessel and eventually overflow into a reservoir from where they can be recovered from the vessel.

The clarified produced water is removed from the vessel through a liquid outlet line, which is preferably located near the bottom of the vessel. At this point, the clarified produced water is pure enough to reuse in the well or to return to the environment.

Thus, the present invention provides a compact gas flotation apparatus and process which uses system gas to effectively and efficiently separate oils, solids, and other insoluble and/or suspended substances from produced water, as illustrated and described in more detail in the following drawings and description.

BRIEF DESCRIPTION OF THE DRAWINGS

The invention will be better understood by reference to the accompanying drawings wherein.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof) falling within the scope of the appended claims.

The gas flotation apparatus and process of the present invention can, in general, be used to remove oils, solids, and other insoluble and/or suspended substances (sometimes collectively referred to as "oil and other contaminants") from a liquid. As such, it should be understood that the present invention has utility in numerous applications in which it is desirable to separate oil and other contaminants from a liquid, and that the separated oil and the liquid, or both, may be the desired end product of the process. However, for purposes of simplification and without any intent to limit the scope of the invention, the gas flotation apparatus and process of the present invention will be described with particular reference to the removal of oil and other contaminants from produced water which is typically generated in the production of crude petroleum and natural gas.

Figure 1:
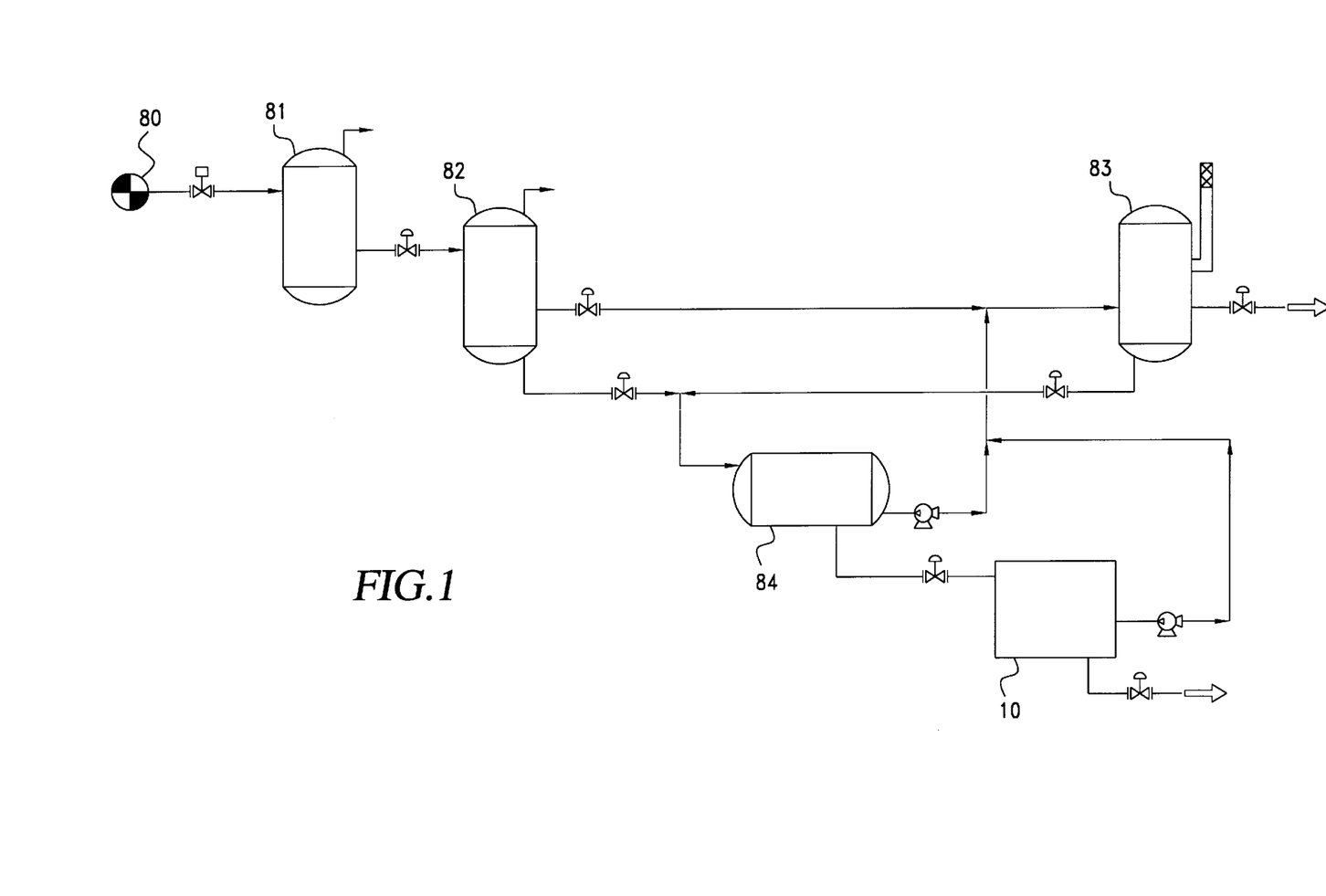
FIG. 1 is a flow diagram of a typical oil and gas production process.

In a typical oil and gas production process, as illustrated in FIG. 1, oil, water, and natural gas are produced from an on-shore or off-shore reservoir (not shown) and passed through a wellhead 80 before being introduced into a high pressure separator 81, where the liquid and gas components of the oil, water, and natural gas are separated primarily by gravity. Oil and water flow from high pressure separator 81 into a low pressure separator 82, where residual gas is separated from the oil and water, and the oil and water are separated from each other by gravity. Oil from low pressure separator 82 flows to a heater treater 83, where more is water is separated from the oil. Water containing oil and dissolved gases flows from the bottoms of low pressure separator 82 and heater treater 83 to a skimmer 84. Produced water containing residual oil and dissolved gases flows from the bottom of skimmer 84 to the apparatus 10 of the present invention.

Figure 2:
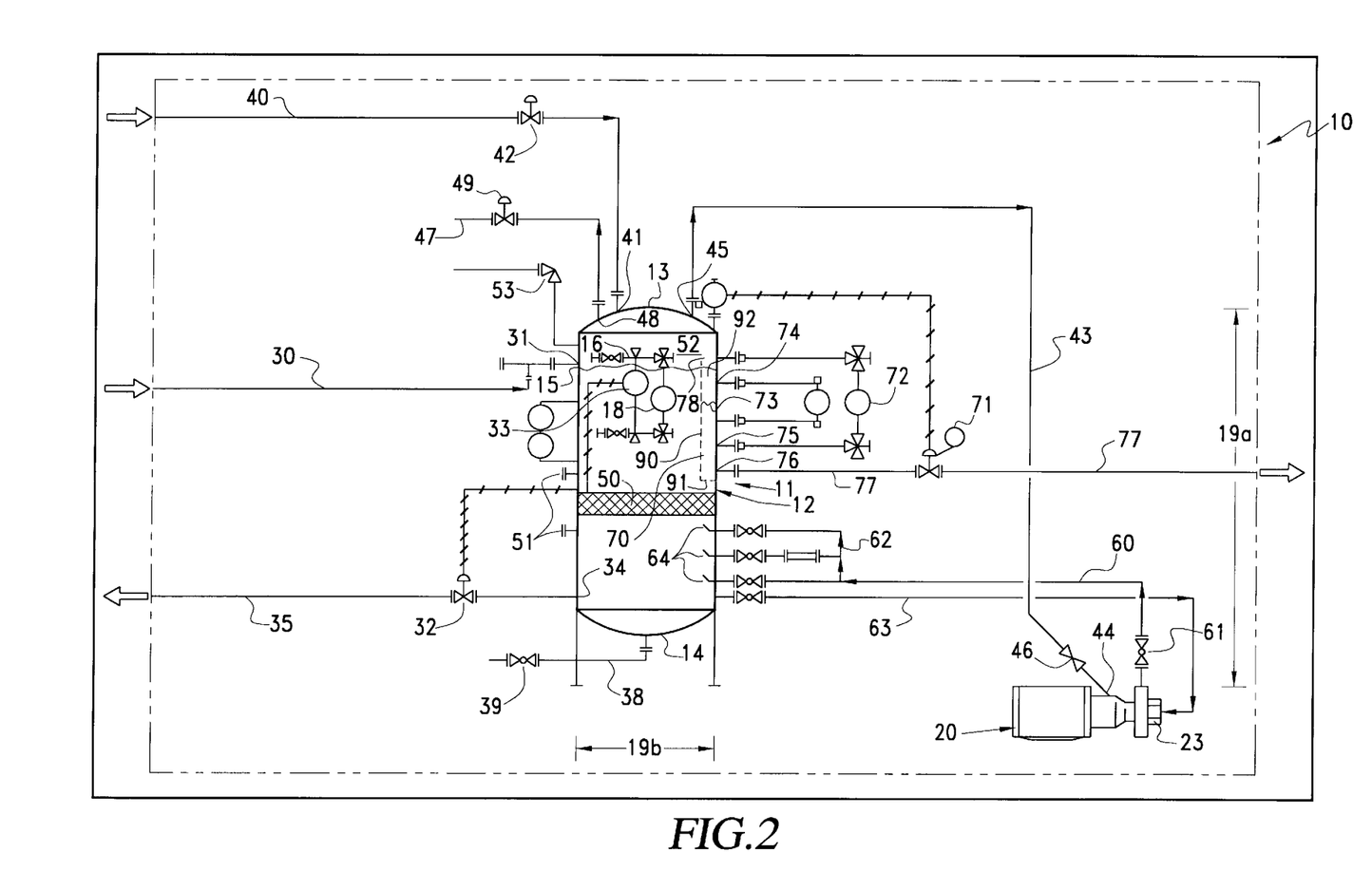
FIG. 2 is a flow diagram of the apparatus of the present invention.

Referring now to FIG. 2, apparatus 10 of the present invention comprises a vessel 11, a water inlet line 30, a gas supply line 40, a pump 20, a water recirculating line 60, a water outlet line 35, and an oil outlet line 77. The components of apparatus 10 are preferably constructed of carbon steel, but can be constructed of any material suitable for industrial applications, such as, for example, stainless steel and heavy-duty fiberglass. When vessel 11 is constructed of carbon steel, its inner surface may be lined with some type of coating (not shown) to minimize corrosion. Also, anodes 51 may be installed on vessel 11 to reduce the effects of corrosion.

Figure 3:
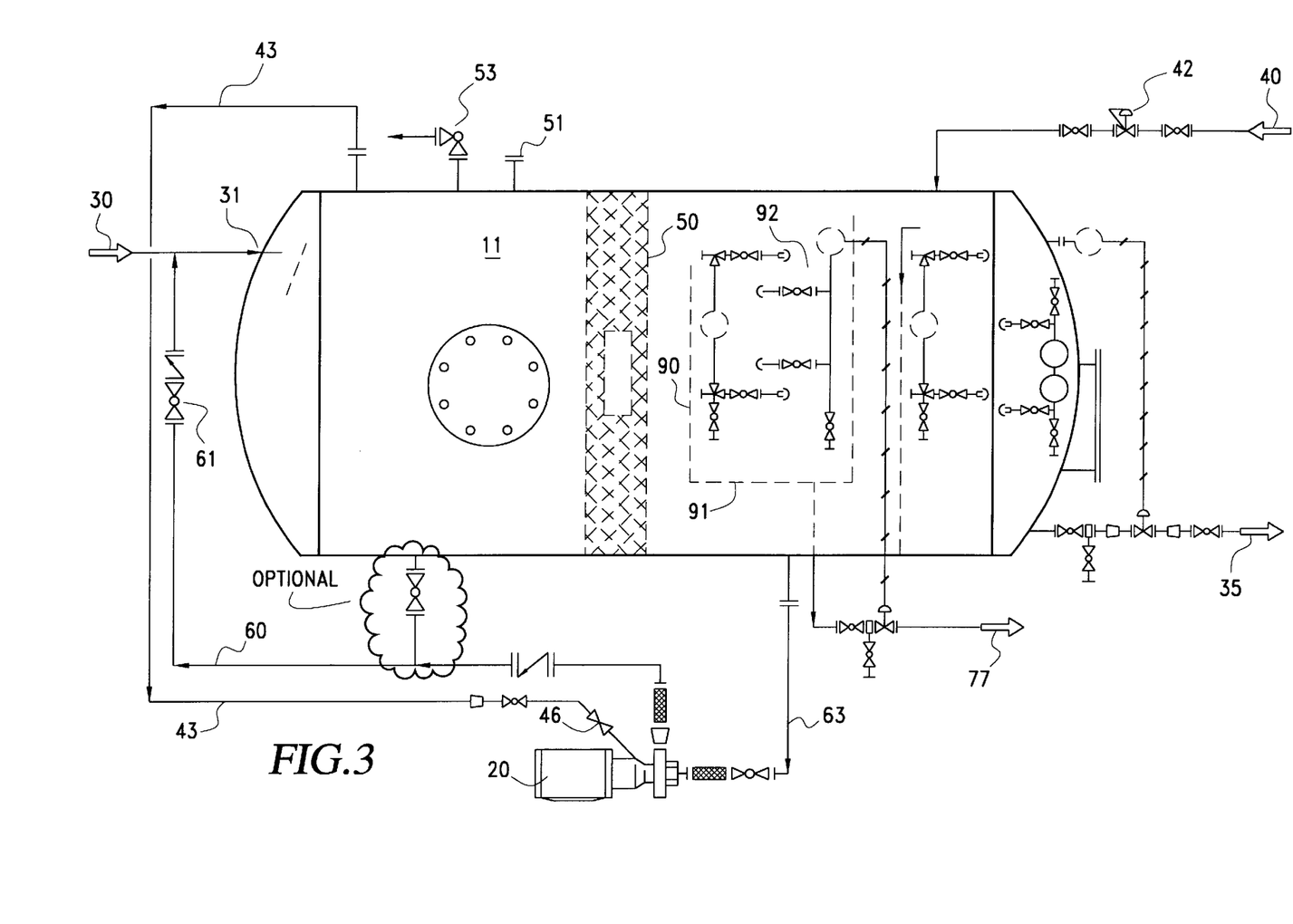
FIG. 3 is a flow diagram of an alternative embodiment of the present invention.

Still referring to FIG. 2, vessel 11 has a sidewall 12, a top 13, and a bottom 14, which all define an enclosed, preferably cylindrical chamber for receiving and maintaining a liquid level 15 therein. Vessel 11 is capable of withstanding substantial internal pressures, such as those pressures typically encountered in the production of oil and gas. The height 19a and diameter 19b of vessel 11 can be any size, depending on the particular application and depending on the liquid flow rate and residence time required for the separation of oils, solids, and other insoluble and/or suspended substances from the produced water contained inside vessel 11, as discussed in greater detail below. Also, vessel 11 can either be substantially vertical upflow separator, as shown in FIG. 2, or substantially horizontal cross-flow separator, as shown in FIG. 3. The following description relates to the preferred vertical upflow separator configuration, as shown in FIG. 2.

As illustrated in FIG. 2, several process lines fluidly connected to vessel 11 allow for the flow of materials in and out of vessel 11. Water inlet line 30 supplies vessel 11 with produced water having oils, solids, and other insoluble and/or suspended substances (generally referred to as "oils and other contaminants"), and dissolved gas. The produced water, along with the dissolved gas and oils and other contaminants, enters vessel 11 through water inlet 31, which is preferably positioned near top 13 of vessel 11 to maximize the liquid-to-gas contact time as the produced water and oil and other contaminants migrate downwardly toward bottom 14 of vessel 11. The dissolved gas contained in the produced water is released within vessel 11 and accumulates in vapor space 52. From vapor space 52, the gas either can either exit vessel 11 through gas outlet 48 or enter gas transfer line 43 in route to pump 20, as explained in more detail below. The released gas contained in vapor space 52 can also exit vessel 11 through relief valve 53 if the pressure inside vessel 11 reaches a predetermined relief pressure.

Gas supply line 40 provides a second source of gas into vessel 11. Pressure control valve 42 is disposed in gas supply line 40 to ensure that the supply of gas is provided to vessel 11 at a relatively constant pressure, preferably lower than the internal pressure rating of vessel 11. Similar to the dissolved gas released from the produced water entering vessel 11, the gas entering vessel 11 through gas supply line 40 accumulates in vapor space 52, from where the gas can either exit vessel 11 through gas outlet 48 or relief valve 53, or enter gas transfer line 43 in route to pump 20, as explained in more detail below.

The gas entering vessel 11 serves two primary purposes, namely, (1) to provide a gas blanket for vessel 11 and (2) to provide a flotation gas for facilitating the desired separation of the oil and other contaminants from the produced water contained within vessel 11. Any suitable gas can be used, including but not limited to natural gas, carbon dioxide, nitrogen, a waste flue gas, and air. However, in most oil and gas production applications, it is generally convenient and preferred to use a non-oxidizing gas, such as natural gas, which has a high affinity to oil and also counteracts corrosion. Natural gas is a normal byproduct of the oil production process and is usually readily available on most oil and gas production facilities. The use of natural gas not only counteracts corrosion, but also eliminates the need for bulky gas compression and storage equipment.

Figure 4:
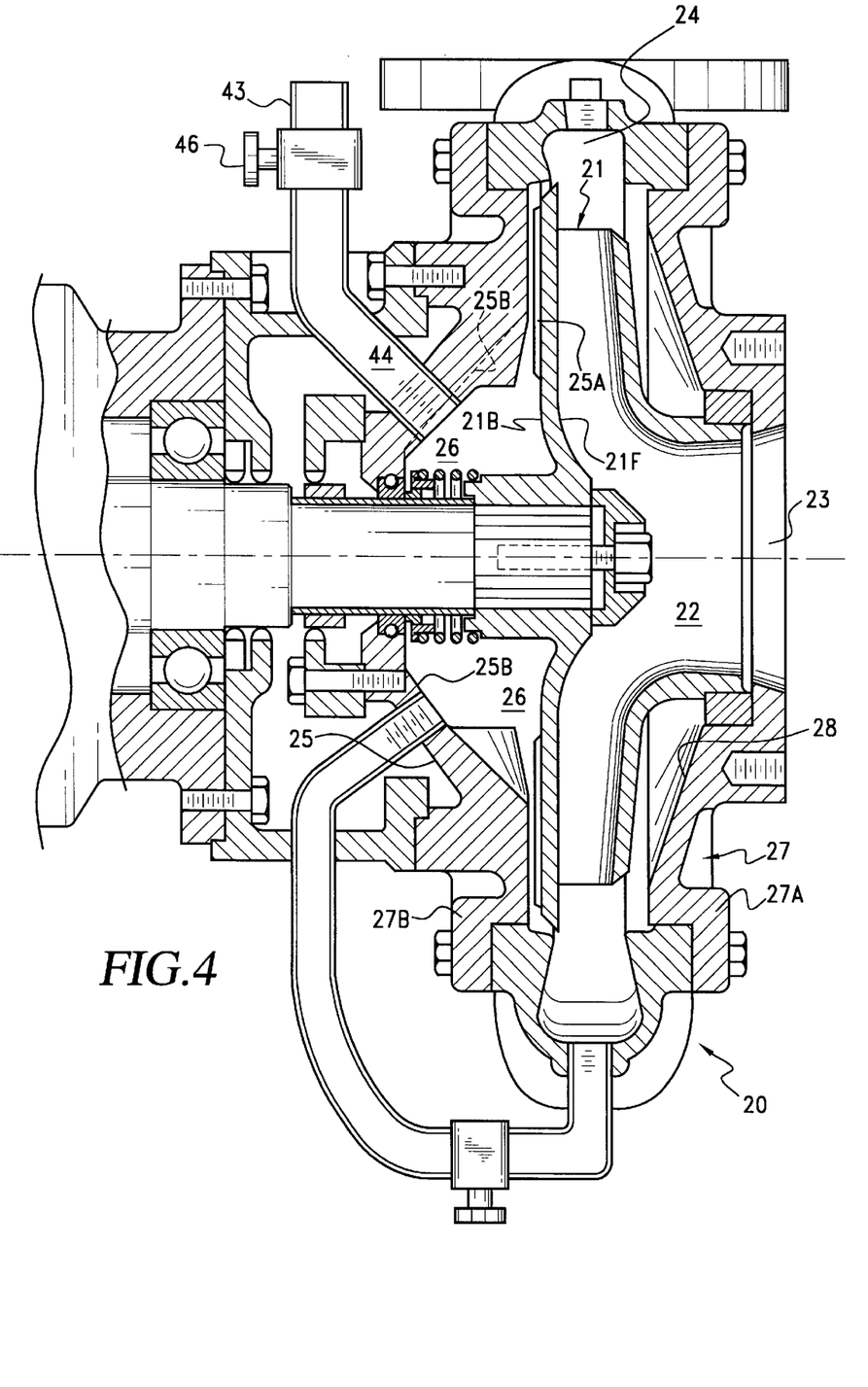
FIG. 4 is a cross sectional view of a centrifugal pump employed in the present invention.

Pump 20 provides a means for introducing tiny flotation gas bubbles into vessel 11. Pump 20 is preferably a centrifugal pump of the type described in U.S. Pat. No. 5,591,001, issued on Jan. 7,1997, to Robert B. Ray, et al. More particularly, pump 20 is preferably a centrifugal pump having a casing 27, as shown in FIG. 4. Casing 27 includes a front casing section 27A, with an internal pump chamber wall 28 defining a pump chamber 22 having the usual volute configuration. Casing 27 also includes a back casing section 27B, which includes a backplate portion 25.

A rotatable impeller 21 located within pump chamber 22 produces, on rotation, movement of the liquid being pumped. This liquid enters pump chamber 22 through intake 23. The pressurized liquid exits pump chamber 22 through discharge 24. Impeller 21 has a front 21 F and a back 21B.

Backplate portion 25 of pump 20 has an inner wall 25B, which, when combined with back 21B of impeller 21, forms what is referred to as a seal chamber 26. Gas is introduced into seal chamber 26 by means of gas transfer line 43, as shown in FIG. 2. One end 44 of gas transfer line 43 is connected to seal chamber 26 and the opposite end 45 of gas transfer line 43 is connected to top 13 of vessel 11, thereby providing a means for transferring gas from vessel 11 into seal chamber 26. Adjustable gas valve 46 is disposed in gas transfer line 43 to control the rate of gas flowing from vessel 11 to seal chamber 26.

During operation of pump 20 and rotation of impeller 21, liquid is drawn in through intake 23. It is desirable to use the substantially oil-free produced water (referred to as "clarified produced water") that has been previously processed in vessel 11 of the present invention. Therefore, intake line 63, which provides fluid communication between intake 23 of pump 20 and vessel 11, as shown in FIG. 2, is preferably connected to vessel 11 in the vicinity of bottom 14 to ensure that the cleanest water in vessel 11 is used.

Referring back to FIG. 4, a portion of the clarified produced water entering pump 20 flows around the periphery of impeller 21 into seal chamber 26. When pump 20 is operating, a negative or subatmospheric pressure is produced in seal chamber 26 in an annular region extending about the shaft 29 of impeller 21. The negative pressure draws gas through gas transfer line 43 and into seal chamber 26, with the amount of such gas being controlled through the adjustment of gas valve 46 (or by using a properly sized orifice, which is not shown).

A stationary vane structure 25A, which is part of back plate portion 25, promotes mixing of the gas with the clarified produced water in seal chamber 26. The mixing action causes the gas to separate into micro-fine bubbles. The stationary vane structure 25A directs the clarified produced water/gas mixture outwardly from seal chamber 26 around the periphery of impeller 21 so that the clarified produced water/gas mixture can join the stream of clarified produced water being discharged from pump 20 through discharge 24. As the clarified produced water/gas mixture is subjected to the discharge pressure of pump 20, the micro-fine bubbles dissolve into the clarified produced water.

Referring back to FIG. 2, the clarified produced water/gas mixture discharged from pump 20 is directed through recycle line 60, which provides fluid communication between discharge 24 of pump 20 and vessel 11. Recycle line 60 is preferably equipped with a backpressure valve 61 to maintain the discharge pressure of pump 20 in a predetermined range. Field tests have shown that an optimum bubble size is obtained when the discharge pressure of pump 20 is in the range of 55 to 65 psig. Backpressure valve 61 should be disposed in line 60 a sufficient distance from pump 20 so as to allow adequate gas saturation time, preferably at least ten (10) seconds, for the micro-fine bubbles to dissolve into the clarified produced water being discharged from pump 20.

Recycle line 60 connects with vessel 11 via manifold header 62 preferably in the vicinity of bottom 14. Manifold header 62 is arranged so as to uniformly distribute the clarified produced water/dissolved gas mixture from pump 20 over a horizontal plane area preferably below the liquid level contained within vessel 11. As the clarified produced water/dissolved gas mixture is dispersed into vessel 11 through manifold header 62, the dissolved gas effervescently releases from the clarified produced water, thereby forming tiny, finely dispersed gas bubbles. The tiny, finely dispersed gas bubbles provide for maximum clarification of the produced water, as explained below.

As the tiny gas bubbles rise vertically through the produced water inside vessel 11, intermolecular attractions between the gas bubbles and the oils and other contaminants suspended in the produced water cause the gas bubbles to contact and attach themselves to the oils and other contaminants. The tiny, finely dispersed gas bubbles provide for very efficient contacting between the gas bubbles and the oils and other contaminants, thereby reducing vessel chamber retention time requirements and thus, reducing the vessel size requirements.

Once attached to the oils and other contaminants, the gas bubbles reduce the density of the oils and other contaminants causing them to be buoyantly transported toward top 13 of vessel 11. As the oils and other contaminants rise through vessel 11, two events occur which enhance separation. First, the gas bubbles attached to the oils and other contaminants are subjected to a reduced hydrostatic pressure as they rise, which causes the bubbles to grow in size. The increased size of the bubbles enables them to attach to and capture more oils and other contaminants. Second, as more oils and other contaminants are contacted by the rising bubbles, the oils and other contaminants themselves tend to contact each other and coalesce into larger, more buoyant droplets.

An optional packing section 50, as shown in FIG. 2, may be positioned adjacently above outlet 64 of manifold header 62 to further disperse the tiny gas bubbles rising through vessel 11 and to coalesce the suspended oils and other contaminants contained inside vessel 11. Packing section 50 can also increase the interaction between the tiny air bubbles and the oils and other contaminants to improve separation efficiency. Packing section 50 can be constructed of a mesh material or any other similar packing material known to those skilled in the art.

Once the gas bubbles reach the top of the liquid level in vessel 11, the bubbles "pop" due to the equalization in pressure between the bubbles and the pressure within the top portion of vessel 11, thereby releasing the oils and other contaminants. The gas accumulates in a vapor space 52 above the liquid level and eventually is either recycled through gas transfer line 43, as explained above, or transferred out of vessel II through gas outlet 48 or relief valve 53. The gas exiting vessel 11 through gas outlet 48 is transferred to a vent or storage via gas outlet line 47, through which the rate of gas is controlled using outlet pressure control valve 49. Outlet line 47 may also be equipped with a flame arrester 54 to minimize the risk of fire and explosions.

The oils and other contaminants released from the gas bubbles form a film on top of the liquid level 15 inside vessel 11. Once the oil film reaches a predetermined height within vessel 11, it overflows over weir 78 into reservoir 70, which can be located inside vessel 11. Reservoir 70 can either be a bucket-type reservoir, as shown in FIGS. 2 and 3, or a circumferential-type reservoir, as shown in FIGS. 5 and 6.

The bucket-type reservoir 70 shown in FIGS. 2 and 3 has a sidewall 90, a bottom 91, and an open top 92, which, together with a portion of sidewall 12 of vessel 11, combine to form an enclosed container for receiving and containing oils and other contaminants.

Figure 5:
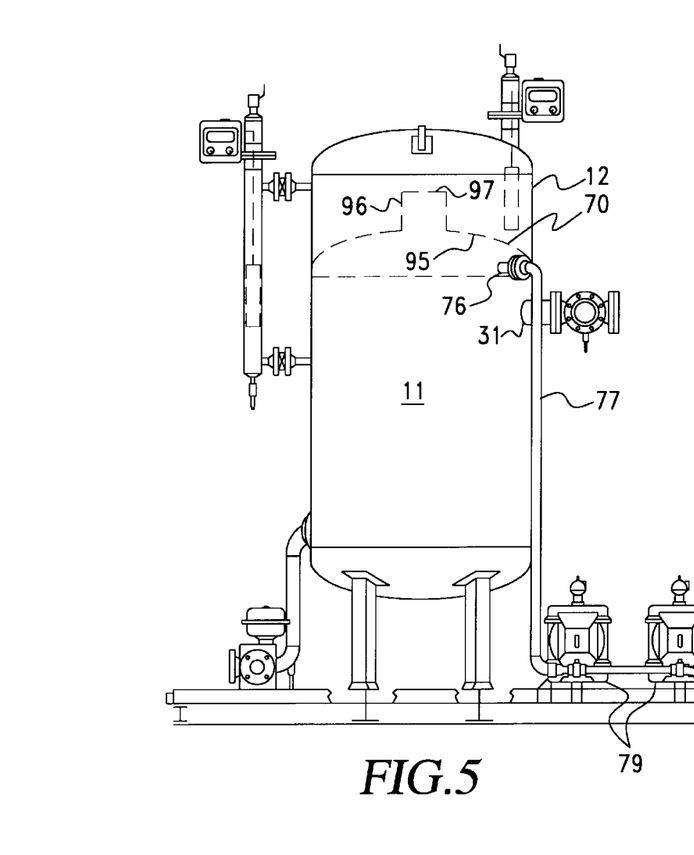
FIG. 5 is a cross sectional view of an alternative embodiment of the oil reservoir of the present invention.
Figure 6:
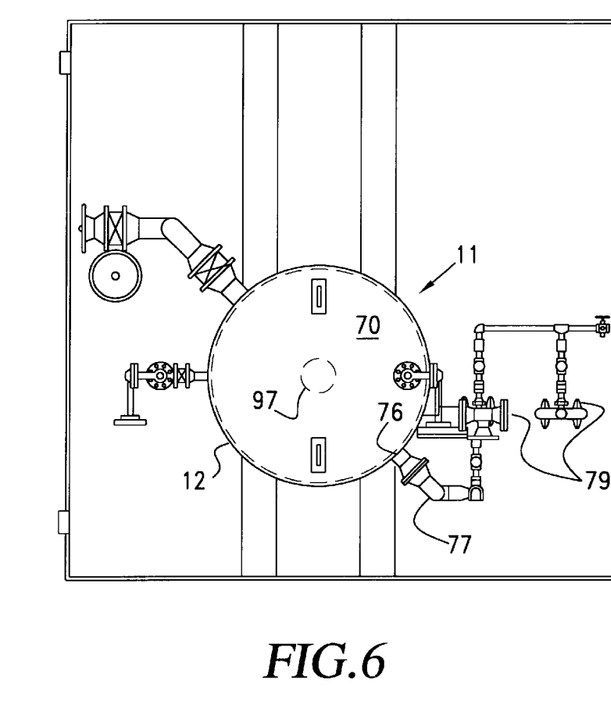
FIG. 6 is a plan view of an alternative embodiment of the oil reservoir of the present invention.

The circumferential-type reservoir 70 shown in FIGS. 5 and 6 has a bottom 95 which is sealably attached to sidewall 12 of vessel 11 along the circumference of vessel 11 in a substantially horizontal plane above liquid inlet 31, as shown in FIG. 5. Bottom 95 slopes upwardly from the circumference of vessel 11 toward the center of vessel 11, where bottom 95 is equipped with a raised opening 96. Raised opening 96 is preferably cylindrical and has a top edge 97, as shown in FIGS. 5 and 6. As the film of oil and other contaminants collects on top of the liquid level inside vessel 11, the layer of oil and other contaminants rises through raised opening 96 until the oil and other contaminants flow over top edge 97 onto bottom 95 of reservoir 70. The oil and other contaminants flow downwardly over the sloped surface of bottom 95 toward sidewall 12 of vessel 11, where they exit vessel 11 through outlet 76 and outlet line 77.

The configuration of circumferential-type reservoir 70 minimizes the risk of produced water overflowing into reservoir 70 when vessel 11 is leaning a few degrees off vertical or when vessel 11 is being operated in rough conditions. Raised opening 96 restricts the cross-sectional area in which the film of oils and other contaminants accumulates inside vessel 11, thereby reducing the chance of produced water spilling over top edge 97 of raised opening 96 as a result of a skewed liquid level inside vessel 11 and/or liquid sloshing inside vessel 11.

Regardless of the configuration of reservoir 70, the accumulated oils and other contaminants are removed from reservoir 70 through outlet 76 and via outlet line 77. A motor-driven valve 71 is disposed in outlet line 77 and is used to control the amount of oils and other contaminants flowing out of reservoir 70, as shown in FIG. 2. Motor-driven valve 71 is actuated by level control device 72 so that the level 73 within reservoir 70 is maintained between high level point 74 and low level point 75. When level 73 approaches or reaches high level point 74 within reservoir 70, level control device 72 actuates motor-driven valve 71, thereby opening valve 71 to allow oils and other contaminants to flow through outlet line 77 and out of reservoir 70. Level control device 72 may also be used to actuate a pump 79, as shown in FIGS. 5 and 6, to pump away the accumulated oils and other contaminants. Likewise, when level 73 approaches or reaches low level point 75 within reservoir 70, level control device 72 actuates motor-driven valve 71, thereby closing valve 71 to restrict or stop the oils and other contaminants from flowing through outlet line 77, as shown in FIG. 2.

The clarified water is removed from vessel 11 through liquid outlet 34 and via liquid outlet line 35, as shown in FIG. 2. Liquid outlet 34 is preferably located near bottom 14 of vessel 11, but is not necessarily at the lowest point on vessel 11 to avoid potential plugging problems caused by debris introduced into vessel 11 through produced water inlet line 30. Rather, clean out line 38 is preferably connected to the lowest point on vessel 11 for flushing sand and other debris from the bottom of vessel 11, as shown in FIG. 2. Clean out valve 39 is disposed in clean out line 38 to control the rate of liquid therethrough.

A motor-driven valve 32 is attached to liquid outlet line 35 and is used to control the amount of liquid flowing through outlet line 35. Motor-driven valve 32 is actuated by liquid level control device 33, which maintains the liquid level 15 inside vessel 11 between high liquid level point 16 and low liquid level point 17. Using level control device 33, liquid level 15 can be adjusted to provide the most efficient operation of apparatus 10.

Apparatus 10 may be equipped with a level shut-off device 18, which is designed to shut down apparatus 10 when liquid level 15 rises to high liquid level point 16 or falls to low liquid level point 17. High liquid level point 16 is preferably below oil weir 78 to prevent produced water from overflowing into reservoir 70. Low liquid level point 17 is preferably above liquid outlet 34 to prevent any oils, solids, and other insoluble and/or suspended substances from flowing through liquid outlet line 35.

As on optional feature, various chemical additives can be added through an injection apparatus (not shown). The additives can be comprised of coagulants or flocculent agents and/or combinations of these agents and other materials. The amount and nature of the additives used depends upon the specific clarification needs and physical properties of the influent such as pH, particulate and/or emulsion suspension contaminations, as well as the liquid to be clarified.

Thus, the present invention provides a dissolved-gas flotation apparatus and process which uses system gas to efficiently and effectively separate oils and other contaminants from produced water. The present invention solves the problems of the prior art and achieves its objects through an improved dissolved-gas flotation design which provides intimate mixing of produced water with tiny, finely dispersed gas bubbles derived from the natural gas which is readily available from production of oil and gas. The relatively simple design and operation of the present invention provides for a system that is inexpensive to build, install, and operate. Furthermore, due to the mechanical simplicity of the present invention, there is less likelihood of mechanical failure of such systems as gas recovery compressors, secondary separation equipment, and the like. The reduced likelihood of mechanical failures results in a higher operating efficiency, eliminates the need for back-up components, and reduces the chances that an oil well will need to be shut-in due to failure of surface equipment.

What is claimed is:

1. A dissolved gas flotation apparatus, comprising:
   (a) a vessel for containing a liquid therein at a predetermined liquid level, said vessel having a liquid inlet, a gas inlet, a liquid outlet fluidly connected to said vessel below said predetermined liquid level;
   (b) a fluid recirculating line having a first end and a second end, where said first end is fluidly connected to said vessel below said predetermined liquid level and said second end is fluidly connected to said vessel below said first end;

(c) a pump disposed in said fluid recirculating line for circulating the liquid in said vessel, said pump having a seal chamber;

(d) a gas transfer line having a first end and a second end, where said first end of said gas transfer line is fluidly connected to said vessel above said predetermined liquid level, and said second end of said gas transfer line is fluidly connected to said seal chamber of said pump;

(e) a reservoir connected to said vessel, said reservoir having a opening for allowing contaminants which have accumulated inside said vessel to flow into said reservoir;

(f) a reservoir outlet line fluidly connected to said reservoir;

(g) a gas outlet fluidly connected to said vessel above said predetermined liquid level;

(h) a backpressure valve disposed in said fluid recirculating line downstream of said pump, where said backpressure valve maintains a discharge pressure of said pump within a predetermined range;

(i) a gas pressure control valve fluidly connected to said gas outlet for maintaining a predetermined pressure inside said vessel;

(j) a control valve disposed in said reservoir outlet line for controlling the rate of contaminants exiting said reservoir; and (k) a liquid level control valve fluidly connected to said liquid outlet for controlling said predetermined liquid level.

2. The dissolved gas flotation apparatus of claim 1, further comprising a gas control valve disposed in said gas transfer line.

3. The dissolved gas flotation apparatus of claim 2, wherein said vessel is substantially vertical and gas tight, providing an upflow separator.

4. The dissolved gas flotation apparatus of claim 2, wherein said vessel is substantially horizontal and gas tight, providing an cross-flow separator.

5. The dissolved gas flotation apparatus of claim 3, wherein said reservoir is disposed inside said vessel.

6. The dissolved gas flotation apparatus of claim 4, wherein said reservoir is disposed inside said vessel.

7. The dissolved gas flotation apparatus of claim 5, wherein said reservoir extends circumferentially around said sidewall of said vessel, thereby forming an inverted funnel, said inverted funnel having a raised opening therein for receiving said contaminants accumulated above said liquid contained inside said vessel.

8. A method for separating suspended contaminants from a liquid, comprising the steps of:

(a) providing a vessel for containing a liquid therein at a predetermined liquid level, said vessel having a liquid inlet, a gas inlet, a liquid outlet fluidly connected to said vessel below said predetermined liquid level, and a gas outlet fluidly connected to said vessel above said predetermined liquid level;

(b) introducing a liquid into said vessel through said liquid inlet;

(c) introducing a gas into said vessel through said gas inlet;

(d) recirculating said liquid contained inside said vessel with a pump, said pump having an intake, a discharge, and a seal chamber, where said discharge is fluidly connected to said vessel below said predetermined liquid level, and said intake is fluidly connected to said vessel below said discharge;

(e) transferring gas from said vessel to said seal chamber of said pump, where said gas mixes with the liquid inside said seal chamber to create a stream of liquid and dissolved gas flowing from said pump;

(f) introducing the stream of liquid and dissolved gas into the liquid contained inside said vessel;

(g) allowing the dissolved gas to effervescently release into said liquid inside said vessel into tiny, finely dispersed gas bubbles;

(h) allowing the tiny, finely dispersed gas bubbles to rise through said liquid inside said vessel and attach themselves to contaminants suspended in said liquid, thereby buoyantly transporting said contaminants to said predetermined liquid level;

(i) providing a reservoir connected to said vessel, the reservoir having an opening for receiving said contaminants accumulated above said liquid contained inside said vessel;

(j) providing a reservoir outlet line fluidly connected to said reservoir for discharging said contaminants from said reservoir;

(k) discharging said liquid from said vessel through said liquid outlet;

(l) providing a control valve fluidly disposed in said reservoir outlet line for controlling the rate of contaminants exiting said reservoir;

(m) providing a liquid level control valve fluidly connected to said liquid outlet for controlling said predetermined liquid level inside said vessel;

(n) providing a backpressure valve fluidly connected between said discharge of siad pump and said vessel, where said backpressure valve maintains a discharge pressure of said pump within a predetermined range; and (o) providing a gas pressure control valve fluidly connected to said gas outlet for maintaining a predetermined pressure inside said vessel.

* * * * *